United States Patent [19]

Blake et al.

[11] 4,170,485

[45] Oct. 9, 1979

[54] TITANIUM DIOXIDE SLURRIES FROM RECYCLE MATERIAL

[75] Inventors: David W. Blake; Gerard M. Sheehan; John D. Rowland; George L. Roberts, all of Savannah, Ga.

[73] Assignee: American Cyanamid Company, Stamford, Conn.

[21] Appl. No.: 935,817

[22] Filed: Aug. 22, 1978

[51] Int. Cl.$^2$ ............................................. C09C 1/36
[52] U.S. Cl. .................................................. 106/300
[58] Field of Search .................. 106/300, 309, 308 Q; 423/610, 612; 210/54 C; 209/5

[56] References Cited

U.S. PATENT DOCUMENTS

| | | | |
|---|---|---|---|
| 3,423,186 | 1/1969 | Darr et al. | 423/612 |
| 3,460,957 | 8/1969 | Giovanetti et al. | 106/300 |
| 3,531,310 | 9/1970 | Goodspeed et al. | 106/300 |
| 3,549,091 | 12/1970 | Slepetys | 106/300 |
| 3,658,474 | 4/1972 | Rothwell | 209/5 |
| 3,758,322 | 9/1973 | Roberts et al. | 106/300 |
| 3,825,438 | 7/1974 | Pritchard et al. | 106/300 |
| 3,843,380 | 10/1974 | Beyn | 106/309 |
| 3,980,602 | 9/1976 | Jakubauskas | 106/308 Q |

*Primary Examiner*—Helen M. McCarthy
*Attorney, Agent, or Firm*—Bruce F. Jacobs

[57] ABSTRACT

High gloss titanium dioxide pigment slurries are prepared by using the underflow from the thickener, optionally treated with aluminum oxide, plus an organic dispersant, plus optionally a polyol.

5 Claims, No Drawings

TITANIUM DIOXIDE SLURRIES FROM RECYCLE MATERIAL

This invention relates to titanium dioxide pigment slurries of high solids content which have increased gloss as compared to conventional TiO₂ slurries. More particularly, it relates to pigment slurries having a solids content of from 70–80 weight percent prepared from in-process material, i.e. thickener underflow, which slurries are highly useful in the production of coated papers and water based paints.

Titanium dioxide is at present the premier white pigment of commerce. It is generally produced by either hydrolyzing an aqueous solution of a titanium salt, such as a sulfate, and calcining the hydrolysate at 750°–1000° C., or oxidizing a titanium halide, e.g. titanium tetrachloride, at elevated temperatures of 800° C. or higher, followed by cooling to a temperature below 600° C. The product resulting from the calcination or oxidation contains a substantial amount of oversized, gritty TiO₂ particles which are broken up by either wet or dry grinding. Drying, following wet grinding, frequently causes cementation of agglomerates requiring a further milling treatment before a smooth textured pigment product can be obtained. In the dry milling operation, suspending agents and dispersing aids are often introduced during the milling to facilitate the reduction of the pigment to fine, uniform-sized particles. An optimum means for dry grinding is a fluid energy mill in which the pigment particles are conveyed by a gaseous fluid, such as air or steam, into the outer portion of an inwardly spiraling vortex at high velocity and in a manner which will maintain the vortex at a high rotative speed and relatively low inward speed whereby the pigment aggregates may be fractured.

U.S. Pat. No. 3,536,510 describes high solids content anatase slurries in which dry milled anatase TiO₂ is dispersed in water using appropriate dispersants, preferably alkanolamines. U.S. Pat. No. 3,758,322 describes high solids slurries in which grit-free defflocculated, non-hydrous oxide treated TiO₂ is used to make rutile slurries, using an appropriate dispersant. German Pat. No. 1,908,611 relates to high solids content rutile TiO₂ water mixtures using finished rutile TiO₂-water mixtures dispersed with sodium polyphosphates.

The present invention differs from the above prior art in that in-process material, i.e. thickener underflow, is used as the starting material, and the resultant slurry has improved gloss.

In accordance with this invention, there are provided high solids, high gloss pigment slurries of titanium dioxide prepared from thickener underflow, i.e. in-process material of a relatively fine particle size. In addition, the use of small amounts of a polyol has been found to further improve the gloss characteristics.

The present invention provides high solids content pigment slurries, preferably rutile pigment slurries, with high gloss by using TiO₂ which is derived either from conventional hydrolysis or combustion processes. The exact technique which is used to prepare the crude TiO₂ pigment material does not constitute a part of the present invention and any of the conventional known techniques may be used. However, it has been found preferable to the practice of the present invention that the crude TiO₂ have associated therewith, either by formation in situ or subsequent addition to calcination or oxidation, a small amount of alumina, magnesia or zinc oxide as a color stabilizer.

Thus, one method of obtaining a crude TiO₂ pigment material for use in the present invention is by the digestion of titaniferous material such as ilmenite with a strong mineral acid such as sulfuric acid, whereby there is obtained a soluble titanium salt which is converted to a titanium dioxide composition by controlled hydrolysis, and the resultant hydrolysates are filtered, washed and calcined. Calcination yields a material which after further processing can serve in many conventional pigmentary applications.

For the purpose of the present invention, as stated above, it is useful that the TiO₂ material have associated therewith a small amount of color stabilizer. When the color stabilizer used is Al₂O₃ it can be added to the filtered and washed hydrolysate prior to the calcination step by such as an aluminum salt or a hydrous aluminum oxide.

Likewise, the TiO₂ pigment which is useful as a starting material in the present invention can be obtained by combustion of titaniferous salts such as titanium tetrachloride. Such combustion methods for obtaining TiO₂ pigments are well known and the choice of any particular technique is not an essential part of the present invention. It is a matter of choice whether the color stabilizer is incorporated into the TiO₂ starting material by formation in situ or by addition during the combustion of a titanium compound. It is most convenient to incorporate an aluminum-containing material by formation in situ whereby an aluminum salt such as aluminum chloride is mixed with the titanium tetrachloride and burned concurrently to form TiO₂-containing alumina.

Regardless of the means by which the pigment is obtained, it can be converted according to the present invention to a pigmentary slurry of high solids content and improved gloss.

The crude TiO₂ pigment of above is then processed according to known conventional techniques including screening for removal of oversize particles and grit, optionally treating with reagents such as sodium aluminate, titanium sulfate, zinc sulfate, sodium silicate, etc. or combinations thereof to provide a hydrous oxide coating, filtering, drying and milling in a fluid energy mill micronizer. It is the bottom 10–20% of the product out of the milling step which is used to make the slurries of the present invention. This is the material which is too fine to be packed as dry pigment.

The fines from the milling step, which are too fine to be packed as finished pigment, are then trapped in water in a thickener and allowed to sit for an extended period of time—up to two or three days, though a longer time is not detrimental to the practice of this invention. The fines should be allowed to remain in the thickener for at least 7–8 hours. This material is the "thickener underflow."

The solids content of the thickener underflow may then be increased to the desired amount by (1) filtration to reduce the water content, or (2) addition of up to about 50% dry finished pigment, or (3) a combination of both. In addition, a small amount, i.e. about 0.3 to 2%, of one or more organic dispersants is added.

The dispersants found useful are organic polyelectrolytes and include such as 2-amino-2-methyl-1-propanol, triethanolamine, sorbitol, mannitol, and water soluble salts, for example, sodium salt of polymeric carboxylic acids, such as Tamol 731 and Tamol 850, sold by Rohm & Haas; Daxad 30, sold by W. R. Grace; Nopcosant K, sold by the Nopco Division of Diamond-Shamrock Corporation; Polywet ND-1 of Uniroyal, Inc. at a pH less than about 9.5; Polywet ND-2 of Uniroyal, Inc. and Cyanamer P-35 of American Cyanamid.

It has been found to be advantageous to further add to the slurry, in addition to the above organic dispersants, up to about 2% by weight of a polyol of the formula $$R(CH_2OH)_3$$

wherein R is a straight or branched chain alkyl group having about 1–10 carbon atoms. Preferably, the polyol is trimethylolethane.

It has also been found advantageous to treat the milled fines, after they have been in the thickener, with an aluminum oxide salt so as to further incorporate therein about 0.2–0.75% by weight, based on the weight of dry pigment, of $Al_2O_3$. This $Al_2O_3$ addition has been found to improve the filtration characteristics of the slurry and allow increased solids in the filter cake.

In addition, other conventional additives may be incorporated into the slurry, such as bactericides, extender pigments and thixotropes.

The following examples are presented to further illustrate the invention:

EXAMPLE I

Titanium dioxide pigment was prepared in the conventional manner through the milling step. Most of the product was then packed as dry finished pigment. The fines were collected in water in a thickener and allowed to settle for a period of about 2 days. This material was then filtered to yield a filter cake having about 68% by weight solids and is hereinafter referred to as thickener underflow.

The filter cake was reslurried by agitation and the addition of 0.54% by weight of a dispersant (Nalco 7SJ013). Dry $TiO_2$ (finished pigment) was then added and the solids level raised to 76±0.5%. The slurry was then processed through a Newark Wire Cloth 325 mesh sieve to break up and/or remove any $TiO_2$ agglomerates. The resultant slurry was then ready for use.

To determine the gloss characteristics of the slurry, it was made into a paint using a typical semi-gloss latex formulation containing a polyacrylic latex (Rhoplex AC-490 of Rohm & Haas Co.) along with other conventional ingredients, together with the slurry produced above. The resultant paint was then tested for gloss by forming drawdowns on Morest 017 lacquered Charts with a 6″×0.003″ Bird film applicator. The drawdowns were allowed to dry for 72 hours and then the 60° gloss was determined using a 60° Gardner Gloss Meter. The 60° gloss was 71.67.

EXAMPLE II

The procedure of Example I was repeated with the additional incorporation of 0.09% by weight of trimethylolethane. The resultant 60° gloss was increased to 74.67.

EXAMPLE III

The procedure of Example I was repeated using the slurry formulations as below. A different thickener underflow sample was used than was in Example I. In samples A and B the dispersant was Cyanamer P-35 of American Cyanamid. In sample C, the dispersant was 5SJ-641 of Nalco.

|  | A | B | C |
|---|---|---|---|
| Thickener Underflow (68% solids) | — | 65.49 | 65.49 |
| Dry $TiO_2$ | 75.60 | 34.06 | 34.06 |
| Water | 23.97 | — | — |
| Dispersant | 0.30 | 0.32 | 0.32 |
| Bactericide | 0.05 | 0.05 | 0.08 |
| Trimethylolethane | 0.08 | 0.08 | 0.05 |

Each of these formulations was made into a paint as in Example I and the 60° gloss measured. The results were

|  | A | B | C |
|---|---|---|---|
| 60° Gloss | 51.1 | 67.5 | 64.5 |

This shows the improved gloss obtained using the present invention as compared to a slurry containing conventional dry packed pigment.

EXAMPLE IV

The procedure of Example III was repeated with the following formulations but using a different lot of dry $TiO_2$. The dispersant was Cyanamer P-35.

|  | D | E |
|---|---|---|
| Thickener Underflow (70% solids) | — | 73.60 |
| Dry $TiO_2$ | 75.60 | 25.97 |
| Water | 23.97 | — |
| Dispersant | 0.30 | 0.30 |
| Bactericide | 0.05 | 0.05 |
| Trimethylolethane | 0.08 | 0.08 |

The 60° gloss of latex paints prepared from each slurry (as in Example I) were:

|  | D | E |
|---|---|---|
| 60° Gloss | 42.6 | 65.4 |

EXAMPLE V

The procedure of Example III was repeated using the same thickener underflow material with the following formulation wherein no dry $TiO_2$ was incorporated in the slurry, i.e., only thickener underflow material was used to provide the titanium dioxide pigment. The thickener underflow was increased in solids from 68 to 77% by means of a filter press.

| Thickener Underflow | 99.57 |
|---|---|
| Dispersant (Cyanamer P-35) | 0.30 |
| Bactericide | 0.05 |
| Trimethylolethane | 0.08 |

The 60° gloss of the resultant paint was 67.7.

Thus, it is apparent that the 100% thickener underflow material provides a 60° gloss which is superior to both the solely dry $TiO_2$ system and the mixed underflow/dry systems.

EXAMPLE VI

The procedure of Example III was repeated with the following formulations which demonstrate the improved results of using a polyol as a secondary dispersant. Cyanamer P-35 was used as the primary dispersant in each case.

|  | F | G | H |
|---|---|---|---|
| Thickener underflow (68% solids) | 75.10 | 75.09 | 65.49* |
| Dry TiO$_2$ | 24.25 | 24.26 | 34.05 |
| Dispersant | 0.6 | 0.62 | 0.33 |
| Bactericide | 0.05 | 0.05 | 0.05 |
| Trimethylolethane | — | 0.08 | 0.08 |
| The slurries were made into paint formulations as in Example I and exhibited the following 60° gloss: |  |  |  |
|  | 55.4 | 61.3 | 63.5 |

*(65% solids)

EXAMPLE VII

The procedure of Example VI was repeated except that Nalco 5SJ-641 was used as the dispersant. Samples I and J used the same base material. The formulations and 60° gloss of the resultant paints were as follows:

|  | I | J |
|---|---|---|
| Thickener underflow (68% solids) | 75.03 | 75.05 |
| Dry TiO$_2$ | 24.62 | 24.52 |
| Dispersant | 0.30 | 0.30 |
| Bactericide | 0.05 | 0.05 |
| Trimethylolethane | — | 0.08 |
| 60° Gloss | 56.1 | 59.1 |

EXAMPLE VIII

To demonstrate the benefit of adding aluminum oxide (Al$_2$O$_3$) to the thickener underflow the following comparison was made: A sample of thickener underflow with a solids content of 20% was heated to 70° C.; the pH was adjusted to 6.8 with sodium hydroxide; the underflow was then picked up on a test leaf filter for 45 seconds, washed in clear water for 30 seconds, and allowed to pull dry. The resultant filter cake had a thickness of 3 mm. and contained 51.49% solids.

The above procedure was repeated except before the pH adjustment 0.3% Al$_2$O$_3$ as sodium aluminate was added to the underflow with stirring. The resultant filter cake had a thickness of 5 mm. and contained 68.82% solids.

What is claimed is:

1. A high gloss titanium dioxide slurry comprising:
    60–80% by weight thickener underflow material as the titanium dioxide, the underflow being the bottom product out of a milling step in which the particles are considered too fine to be packed as a dry pigment;
    0.3–2% by weight organic polyelectrolyte dispersant; and the balance is water.

2. The slurry of claim 1 wherein the thickener underflow has added thereto about 0.2–0.75% by weight, based on the dry weight of titanium dioxide, of aluminum oxide.

3. The slurry of claim 1 further containing up to about 2% by weight of a polyol of the formula

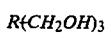

$$R(CH_2OH)_3$$

wherein R is an alkyl group having 1–10 carbon atoms.

4. The slurry of claim 3 wherein the polyol is trimethylolethane.

5. In a high gloss titanium dioxide slurry comprising 60–80% by weight titanium dioxide, 0.3–2% by weight organic polyelectrolyte dispersant, and the balance water, the improvement comprising thickener underflow material as at least about 50% of the titanium dioxide, the underflow being the bottom product out of a milling step in which the particles are considered too fine to be packed as a dry pigment.

* * * * *